US010186405B2

(12) United States Patent
Conde et al.

(10) Patent No.: US 10,186,405 B2
(45) Date of Patent: Jan. 22, 2019

(54) MULTIBAND PHOTOCATHODE AND ASSOCIATED DETECTOR

(71) Applicant: Photonis France, Brive (FR)

(72) Inventors: Moustapha Conde, Brive-la-Gaillarde (FR); Justin Foltz, Le-Lardin-St-Lazare (FR)

(73) Assignee: PHOTONIS FRANCE, Brive (FR)

( * ) Notice: Subject to any disclaimer, the term of this patent is extended or adjusted under 35 U.S.C. 154(b) by 0 days.

(21) Appl. No.: 15/564,880

(22) PCT Filed: Apr. 6, 2016

(86) PCT No.: PCT/EP2016/057468

§ 371 (c)(1),
(2) Date: Oct. 6, 2017

(87) PCT Pub. No.: WO2016/162351

PCT Pub. Date: Oct. 13, 2016

(65) Prior Publication Data

US 2018/0096829 A1 Apr. 5, 2018

(30) Foreign Application Priority Data

Apr. 8, 2015 (FR) ..................................... 15 53027

(51) Int. Cl.
*G01J 5/00* (2006.01)
*H01J 40/06* (2006.01)

(Continued)

(52) U.S. Cl.
CPC ................ *H01J 40/06* (2013.01); *H01J 1/34* (2013.01); *H01J 40/16* (2013.01); *H01J 2201/3423* (2013.01)

(58) Field of Classification Search
CPC ........ H01J 1/34; H01J 2201/342; H01J 40/06; H01J 40/16
See application file for complete search history.

(56) References Cited

U.S. PATENT DOCUMENTS 3,958,143 A 5/1976 Bell
5,471,051 A * 11/1995 Niigaki .................... H01J 1/34 250/214 VT (Continued)

OTHER PUBLICATIONS

Search Report issued in French Patent Application No. 1553027 dated Feb. 8, 2016.

(Continued)

*Primary Examiner* — Kiho Kim
(74) *Attorney, Agent, or Firm* — Pearne & Gordon LLP

(57) ABSTRACT

The invention relates to a photocathode including an input window (210) suitable for receiving a flow of incident photons, and an active layer (230), the active layer consisting of a plurality of elementary layers (2301, 2302) made of semiconductor materials having decreasing forbidden bandwidths in the direction of the flow of incident photons. The surface of the photocathode opposite the input window is structured so that each elementary layer of the active layer has its own photoelectric emission surface (2401, 2402). By choosing the semiconductor materials of the elementary layers, it is possible to obtain an image which has high sensitivity in both the visible spectrum and the near infrared.

14 Claims, 7 Drawing Sheets

(51) Int. Cl.
*H01J 1/34* (2006.01)
*H01J 40/16* (2006.01)

(56) References Cited

U.S. PATENT DOCUMENTS

| | | | | |
|---|---|---|---|---|
| 5,932,966 | A * | 8/1999 | Schneider | G03F 7/70375 313/530 |
| 6,005,257 | A | 12/1999 | Estrera | |
| 6,069,445 | A * | 5/2000 | Smith | H01J 1/34 250/214 VT |
| 7,592,747 | B1 * | 9/2009 | Beach | H01J 1/34 313/532 |
| 2004/0056279 | A1 * | 3/2004 | Niigaki | H01J 1/34 257/202 |
| 2004/0094755 | A1 * | 5/2004 | Hirohata | H01J 1/34 257/10 |
| 2004/0232403 | A1 | 11/2004 | Sillmon | |
| 2006/0038473 | A1 * | 2/2006 | Mochizuki | H01J 1/34 313/373 |

OTHER PUBLICATIONS

International Search Report issued in Application No. PCT/EP2016/057468 dated Jul. 18, 2016.

Written Opinion issued in Application No. PCT/EP2016/057468 dated Jul. 18, 2016.

* cited by examiner

MULTIBAND PHOTOCATHODE AND ASSOCIATED DETECTOR

TECHNICAL FIELD

The present invention relates to the field of photocathodes, in particular for electromagnetic radiation detectors such as image intensifiers or EBCMOS (Electron Bombarded CMOS) or EBCDD (Electron Bombarded CDD) type sensors. It is applicable in the field of night vision or infrared cameras.

STATE OF PRIOR ART

Electromagnetic radiation detectors, such as, for example, image intensifier tubes and photomultiplier tubes, enable an electromagnetic radiation to be detected by converting it into a light or electrical output signal.

They usually include a photocathode to receive the electromagnetic radiation and emit a flow of photoelectrons in response, an electron multiplier device for receiving said flow of photoelectrons and emit a flow of so-called secondary electrons in response, and then an output device for receiving said flow of secondary electrons and emit the output signal in response.

The output device can be a phosphor screen, ensuring a direct conversion into an image as in an image intensifier or even a CCD or CMOS array to provide an electrical signal representative of the distribution of the flow of incident photons.

In any case, a photocathode usually comprises a layer, referred to as a window layer, transparent in the spectral band of interest, said window layer including a front face, referred to as a receiving face, for receiving the incident photons and a back face opposite thereto. An antireflection layer is deposited onto the front face. An active layer is deposited onto the back face of the window layer. Thus, incident photons pass through the window layer from the receiving face, and then penetrate the active layer where they generate electron-hole pairs.

The generated electrons move to the emitting face of the active layer and are emitted in vacuum.

The photoelectrons are then directed and accelerated to an electron multiplier device such as a micro-channel plate.

The photocathodes are generally made of a semiconductor material III-V such as GaAs. But, if the GaAs photocathodes have a good quantum efficiency in the visible spectrum (in the order of 40%), they are unusable in near infrared, for wavelengths higher than 870 nm (corresponding to the band gap of GaAs).

To obtain photocathodes having a sensitivity both in visible spectrum and near infrared, it has been provided in U.S. Pat. No. 6,005,257 to use an active layer comprised of a plurality of elementary layers of semiconductor materials III-V, of different compositions, the band gaps of these semiconductor materials being chosen decreasing in the direction of the incident flow.

FIG. 1 represents a photocathode, 100, having a multilayer structure, known in the state of the art.

It comprises a glass input window, 110, on which an anti-reflection layer, 121, and an electronic mirror, 122 are deposited. The active layer, 130, located above the mirror consists of a superimposition of N $Ga_{1-x}In_xAs$ elementary layers, $\mathbf{130}_1, \ldots, \mathbf{130}_N$, the concentration x of indium being increasing in the direction of the incident flow. In other words, in the direction of the incident flow, the band gaps of the successive elementary layers have increasingly low band gaps, $E_{g1}, \ldots, E_{gN}$ in the direction of the incident flow, that is $E_{g1}>E_{g2}> \ldots >E_{gN}$. The first elementary layer $\mathbf{130}_1$ absorbs photons with an energy higher than $E_{g1}$, the second layer $\mathbf{130}_2$ absorbs not already absorbed photons and with an energy higher than $E_{g2}$ and so forth. The electrons of electron-hole pairs generated in an elementary layer diffuse up to the photoelectric emission face, 150, from where they are emitted in vacuum and accelerated under the effect of the electric field. The electrons diffusing in the reverse direction to the incident flow are reflected by the band curvature induced by the electronic mirror. In practice, the electronic mirror consists of a semiconductor layer having a band gap higher than that of the active layer. For example, the mirror layer is made of GaAlAs whereas the active layer is of made GaInAs.

Such a photocathode has a sensitivity both in the visible spectrum (from 0.4 to 0.8 μm) and in near infrared spectrum (λ>0.9 μm) or SWIR (Short Wavelength IR). However, such a photocathode generally has an insufficient sensitivity in the visible spectrum. Indeed, electrons generated in the first elementary layers of the active layer have a significant probability of being recombined with holes or of being trapped by defects before reaching the photoelectric emission face. Further, such a photocathode does not enable the part of the spectrum desired to be imaged to be selected.

A first purpose of the present invention is consequently to provide a photocathode having a high sensitivity (that is a quantum efficiency in the order of 25% or even more), in the entire spectral range from visible to near infrared. A second purpose of the present invention is to provide a detector capable of selecting a determined spectral band or even to dynamically switch from a first spectral band, such as that of the visible spectrum, to a second spectral band, such as that of near infrared, and vice versa.

DISCLOSURE OF THE INVENTION

The present invention is defined by a photocathode comprising an input window for receiving a flow of incident photons and an active layer, the active layer comprising a plurality of elementary layers of semiconductor materials having decreasing band gaps in the direction of the flow of incident photons, said photocathode being characterized in that the surface of the photocathode opposite to the input face is structured such that each elementary layer of the active layer has its own photoelectric emission surface.

Typically, the photoelectric emission surface of each elementary layer is formed by an array of patterns, the patterns of two successive elementary layers being interleaved.

The active layer can consist of a first elementary layer of GaAs or GaAsP and a second elementary layer of a semiconductor material chosen from $Ga_{1-x}In_xAs$, $GaAs_{1-x}Sb_x$, $GaAs_{1-x}Bi_x$ with 1>x>0.

Advantageously, the different photoelectric emission surfaces of the elementary layers are covered with an activation layer.

According to an advantageous embodiment, the active layer consists of a first elementary layer and a second elementary layer, the second elementary layer being covered by an emission layer for emitting in vacuum the photoelectrons generated in the second elementary layer, the first elementary layer having a first photoelectric emission surface and the emission layer having a second photoelectric emission surface.

The first elementary layer is then connected to a first electrode and the emission layer is connected to a second electrode distinct from the first electrode so as to be able to bring the first and second electrodes to different potentials.

Preferably, the first and second photoelectric emission surfaces are covered with an activation layer.

The photoelectric emission surface of the first elementary layer is typically formed by a first array of patterns, and in that the photoelectric emission surface of the emission layer is formed by a second array of patterns, the patterns of the first and second arrays being interleaved.

The first and second arrays of patterns are periodical or pseudo-periodical.

The first elementary layer can be made of InP, the second elementary layer of GaInAs, GaInAsP, AlInAsP and the emission layer of InP.

The first elementary layer is made of GaAs, the second elementary layer of GaInAs and the emission layer of GaInP.

The activation layer is made for example of Ag—$Cs_2O$.

Advantageously, the active layer is deposited onto an electronic mirror consisting of a layer of a semiconductor material the band gap of which is higher than the band gaps of the elementary layers.

BRIEF DESCRIPTION OF THE DRAWINGS

Further characteristics and advantages of the invention will appear upon reading preferential embodiments in connection with the appended figures among which.

DETAILED DISCLOSURE OF PARTICULAR EMBODIMENTS

The principle underlying the present invention is to use a photocathode having a multilayer structure the surface opposite to the input window of which is structured such that each elementary layer of the active layer has its own photoelectric emission surface. The photoelectric emission surface of each elementary layer is advantageously in the form of an array of patterns, the patterns of different elementary layers being interleaved. More precisely, each elementary layer other than the first one (in the direction of the incident flow) has an array of windows revealing the photoelectric emission face of the lower elementary layer.

Figure 1:
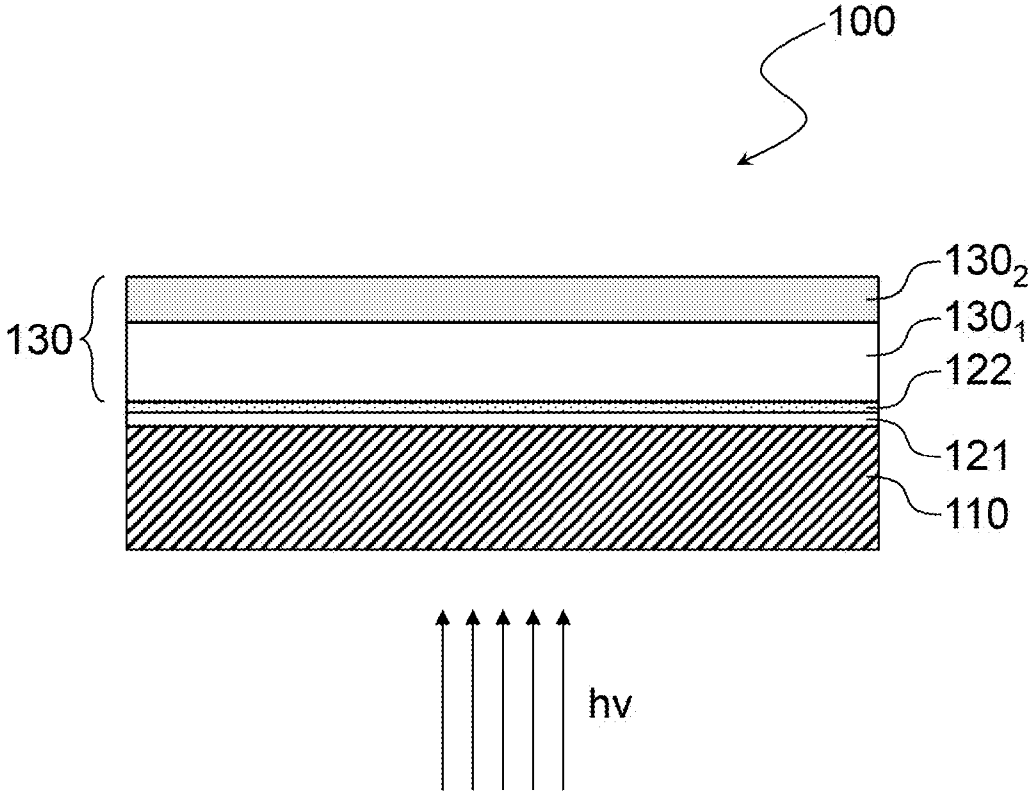
FIG. 1 schematically represents the structure of a multilayer photocathode known in the state of the art.
Figure 2:
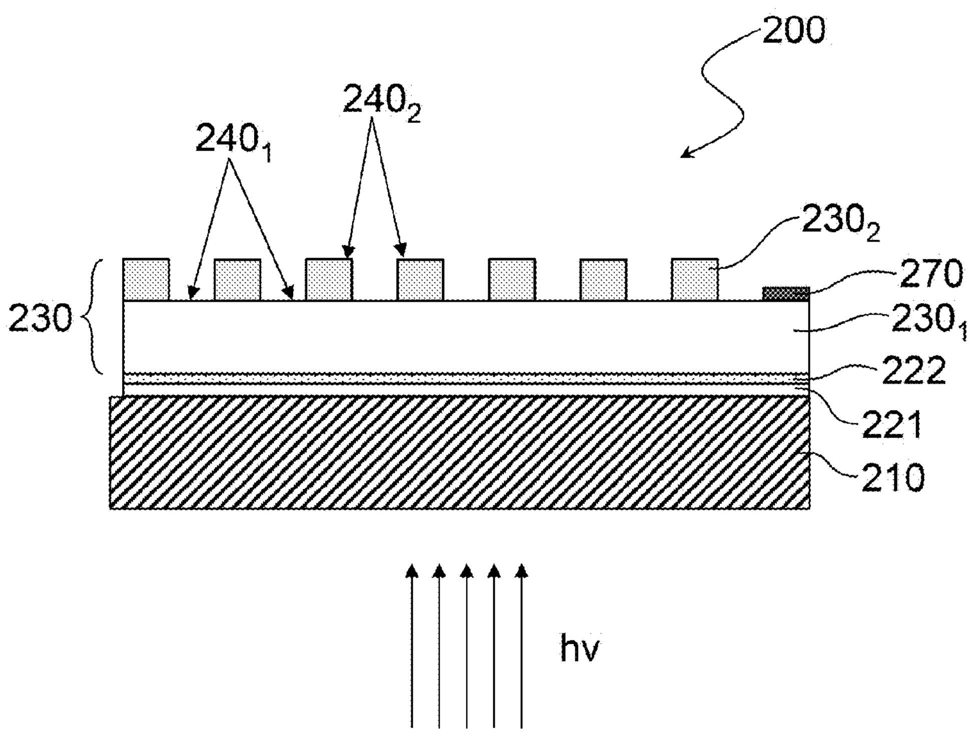
FIG. 2 schematically represents the structure of a multilayer photocathode according to a first embodiment of the invention.

FIG. 2 schematically represents the structure of a multilayer photocathode according to a first embodiment of the invention.

This photocathode comprises a glass input window, 210, for receiving the flow of incident photons on which an antireflection layer, 221, and an electronic mirror, 222, are advantageously deposited, the function of the electronic mirror being to reflect photoelectrons generated in the active layer 230, as in the aforementioned prior art. This active layer is comprised of a plurality of N elementary semiconducting layers with decreasing band gaps in the direction of the flow of incident photons, that is the back face towards the front face of the active layer. The electronic mirror advantageously consists of a layer of semiconductor material having a wider band gap than those of the elementary layers of the active layer.

In the present case, it has been assumed that the active layer was comprised of a first elementary layer, $\mathbf{230}_1$, having a first band gap $E_{g1}$, and a second elementary layer $\mathbf{230}_2$ having a second band gap $E_{g2}<E_{g1}$. Preferably, the elementary layers are made of semiconductor materials III-V, for example ternary alloys of materials III-V such as $Ga_{1-x}In_xAs$, $GaAs_{1-x}Sb_x$, $GaAs_{1-x}Bi_x$ where the concentration x increases in the direction of the flow of the incident photons.

An electrode 270 enables the photocathode to be negatively biased with respect to the anode of the detector in which it is to be mounted, for example an EBCMOS or EBCDD detector.

In the illustrated case, the first elementary layer could be a GaAs layer ($x=0$) or even a thinned GaAs substrate and the second elementary layer of one of the aforementioned ternary compounds with $x>0$. The concentration x is chosen so as to cover the desired spectral band. The electronic mirror could be made of GaAlAs.

These different semiconducting layers are epitaxially grown, for example by MOCVD (MetalOrganic Chemical Vapour Deposition) or MBE (Molecular Beam Epitaxy), in a known manner per se.

The active layer is structured for example by means of a differential etching. This structuration reveals a first photoelectric emission surface consisting of the zones $\mathbf{240}_1$ of the first elementary layer where the second elementary layer has been removed and a second photoelectric emission surface consisting of the zones $\mathbf{240}_2$ of the second elementary layer where it has been spared.

The first photoelectric emission surface can be in the form of a first array of patterns at the surface of the first elementary layer. Likewise, the second photoelectric emission surface can be in the form of a second array of patterns at the surface of the second elementary layer. The patterns of the first and second photoelectric emission surfaces are interleaved. In other words, except for the edges of the photocathode, a pattern of the second elementary layer is thereby located between two patterns of the first elementary layer.

Generally, the photocathode has an active layer comprised of N elementary semiconducting layers, each elementary layer having its own photoelectric emission surface. Each of the photoelectric emission surfaces can be in the form of an array of patterns, the patterns of the photoelectric emission surfaces of two any elementary layers of the active layer are thereby interleaved with the previous meaning.

These patterns have a square, rectangular, hexagonal, annular, sectorial or even more complex shape. The patterns of the different photoelectric emission surfaces advantageously enable a tiling of the plane of the active layer to be made.

The sizes of the patterns and/or the pitches of the arrays relative to the different elementary layers can be chosen different, based on weighting and spectral resolution criteria as explained later.

Figure 3A:
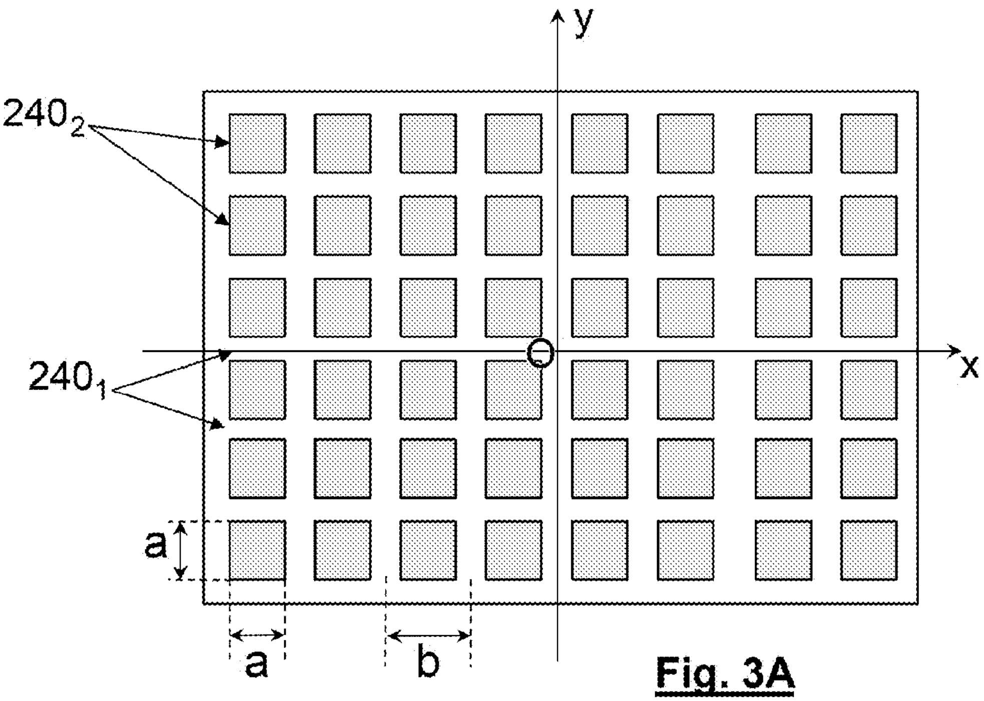
FIGS. 3A to 3D represent in a top view different exemplary structurations of the active layer of a multilayer photocathode according to the first embodiment of the invention.

FIG. 3A represents a first exemplary structuration of the active layer. The photoelectric emission surface of the second elementary layer is in the form of an array of patterns with a pitch b in directions Ox and Oy of the plane, the patterns $240_2$ having here a square shape and a size a×a. The photoelectric emission surface of the first elementary layer is formed by the residual zones $240_1$.

Figure 3B:
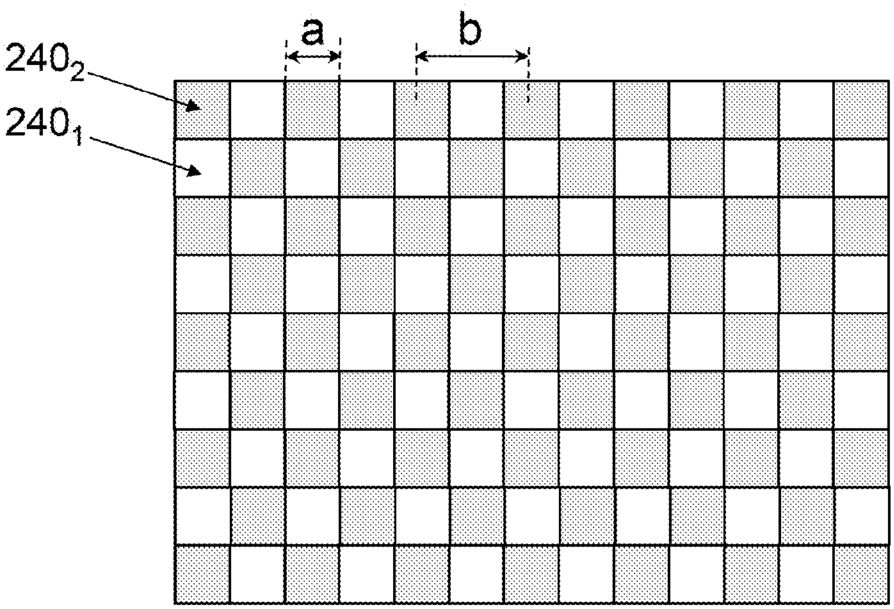

FIG. 3B represents in a top view a second exemplary structuration of the active layer. A first array of patterns, with a pitch b=2a can be distinguished in directions Ox and Oy of the plane. The patterns $240_2$ also have a square shape and a size a×a. The second array formed is the repetition of patterns $240_2$ and has the same characteristics as the first array, the first and second arrays being interleaved.

Figure 3C:
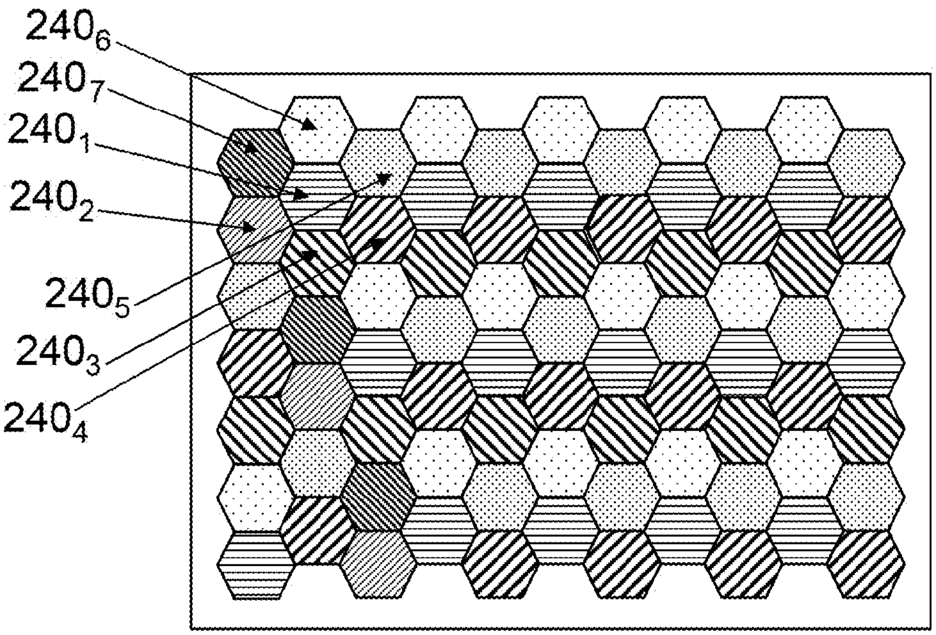

FIG. 3C represents in a top view a second exemplary structuration of the active layer. It is herein comprised of N=7 elementary layers (for example $Ga_{1-x}In_xAs$ layers of with the different values of concentration x). In the figure, the respective patterns of the photoelectric emission surfaces associated with the different elementary layers have been noted $240_1$ to $240_7$. The patterns herein have a hexagonal shape and are interleaved so as to form a tiling of the plane of the active layer.

Figure 3D:
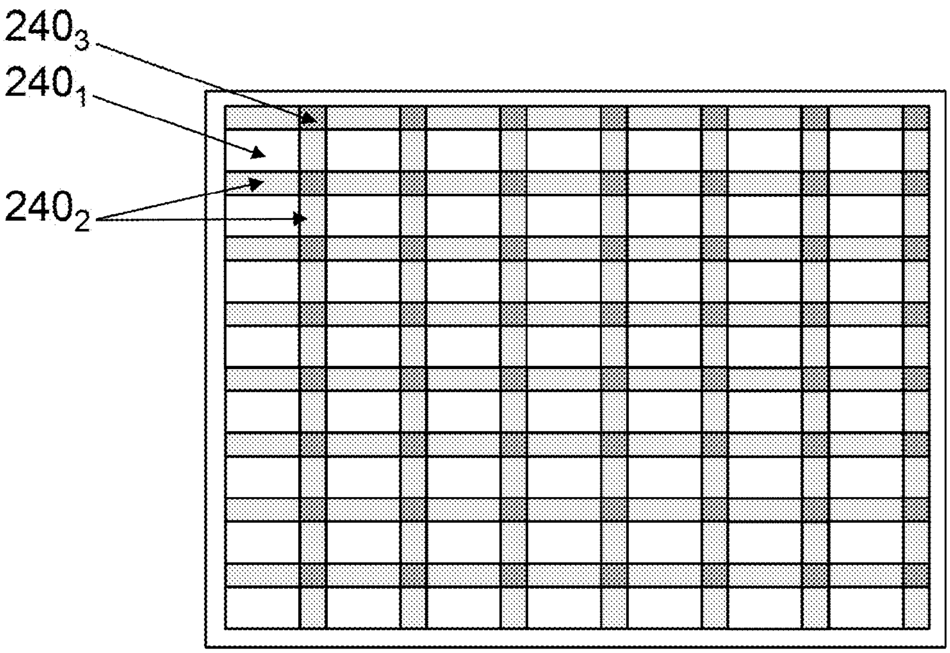

FIG. 3D represents in a top view a third exemplary structuration of the active layer. It is comprised of N=3 elementary layers. The respective patterns of the different photoelectric emission surfaces have been designated by $240_1$ to $240_3$. It will be noted that the patterns are herein rectangular and of different sizes.

Regardless of the contemplated structuration type, the photoelectric emission surfaces of the different elementary layers are advantageously coated with a thin activation layer, for example a $Cs_2O$ layer or even an Ag—$Cs_2O$ layer. This activation layer enables the vacuum level to be lowered below the conduction band level of the elementary layers it covers and thus the photoelectron emission to be facilitated in vacuum (negative electron affinity photocathode).

The respective sizes and periodicities of the patterns of the different elementary semiconducting layers are chosen so as to weight the sensitivity of the photocathode in the different spectral bands.

Turning back to FIG. 2, it is understood that the photoelectrons emitted by the zones $240_1$ of the first GaAs elementary layer correspond to the visible part of the spectrum. On the other hand, the photoelectrons emitted by the zones $240_2$ can be either photoelectrons generated in the first elementary layer $230_1$ having later diffused up to the photoelectric emission surface of the second elementary layer, or photoelectrons generated in the second elementary layer having diffused towards the same surface. In other words, the photoelectrons emitted by the zones $240_2$ of the second elementary layer correspond to the visible spectrum (absorption by GaAs) or to the near infrared spectrum (absorption by $Ga_{1-x}In_xAs$).

By choosing the respective sizes of the zones $240_1$ and $240_2$, it is thereby possible to favor or on the contrary to balance the sensitivity of the photocathode in the visible spectrum and in the near infrared spectrum. In particular, it is thus possible to obtain an image having a high sensitivity both in the visible spectrum and in near infrared.

The photoemission zones $240_1$ and $240_2$ of the first and second elementary layers are arranged according to interleaved patterns. In other words, a pattern of a zone is surrounded by patterns of another zone. These patterns are arranged according to a periodical or pseudo-periodical array in the plane of the photocathode. For example, in FIG. 3B, the patterns of the photoemission zones $240_1$ and $240_2$, are arranged according to two periodical arrays with a pitch b/2 in directions Ox and Oy.

However, if the pitch of the elements of the EBCMOS or EBCDD sensor slightly differs from that of the periodical arrays, a Moiré effect can appear. In this case, it could be preferred to arrange the patterns of the photoemission zones according to a pseudo-random pattern, that is with a pitch $b+\varepsilon(x,y)$, where $\varepsilon(x, y)$ is a pseudo-random variable.

Figure 4:
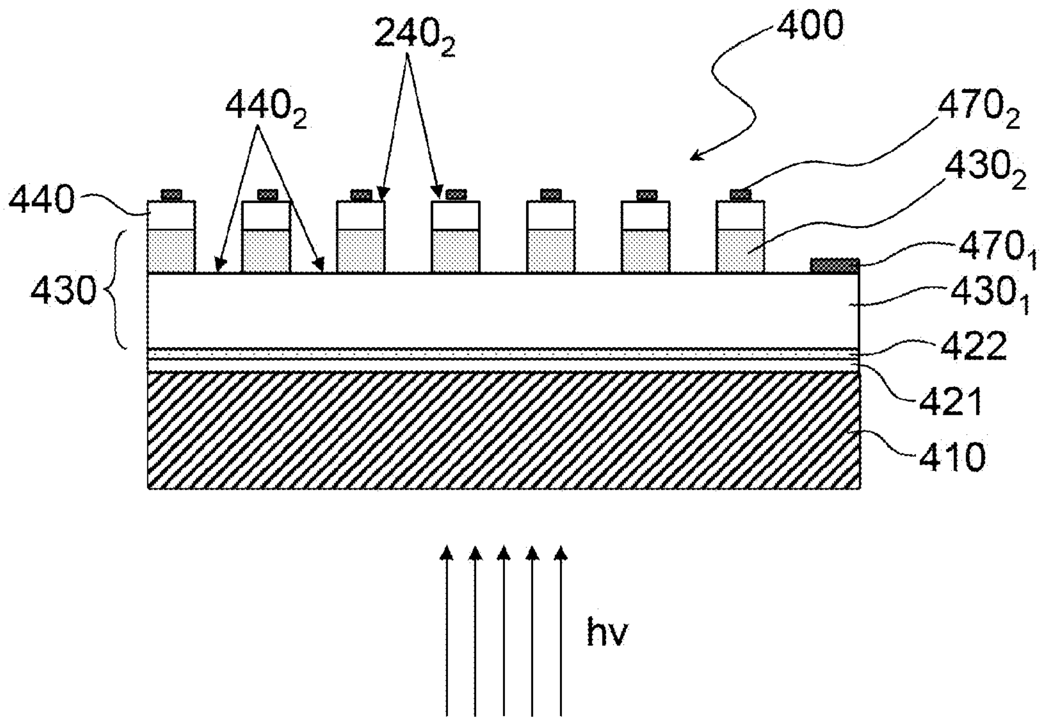
FIG. 4 schematically represents the structure of a multilayer photocathode according to a second embodiment of the invention.

FIG. 4 schematically illustrates the structure of a multilayer photocathode according to a second embodiment of the invention.

This photocathode comprises a glass input window, 410, for receiving the flow of incident photons, on which an antireflection layer, 421, and an electronic mirror, 422 are advantageously deposited, as in the first embodiment.

The active layer 430 is comprised of a first elementary layer $430_1$ in a first semiconductor material having a first band gap $E_{g1}$ and a second elementary layer $430_2$ of a second semiconductor material having a band gap $E_{g2}$ lower than the first band gap. Both these elementary layers are photoelectron generating layers as in the first embodiment.

An electrode, $470_1$, enables the photocathode to be negatively biased with respect to the anode of the detector in which it is to be mounted, for example an EBCMOS or EBCDD detector.

Unlike the first embodiment, a photoelectron emission layer, 440, is deposited onto the active layer. This emission layer is made of a semiconductor material the band gap of which is higher than the band gap of the second semiconductor material. The second elementary layer is $p^+$ doped, at a doping level in the order of $10^{17}$ $cm^{-3}$. On the other hand, the emission layer is, p doped at a doping level substantially lower, in the order of $10^{15}$ $cm^{-3}$. The emission layer is positively biased with respect to the second elementary layer by means of the electrodes $470_2$ such that the emission layer is depleted. Photoelectrons generated in the second elementary layer end up under the action of the electric field in the emission layer with a high energy level with respect to the bottom of the conduction band of this layer. Thereby, they cross more easily the interface barrier with the thin activation layer (not represented) deposited onto the emission layer. This photocathode structure is known as a Transfer Electron Photocathode (TEP). A detailed description of a transfer electron photocathode can be found in U.S. Pat. No. 3,958,143 included herein in reference.

The first elementary layer of the active layer can for example be an InP layer and the second elementary layer can for example be a GaInAs layer. The emission layer can be in this case an InP layer.

Alternatively, the first elementary layer of the active layer can be a GaAs layer, and the second elementary layer can be a GaInAs layer. The emission layer can be in this case a GaInP layer.

In both cases, the electronic mirror can be a GaAlAs layer.

The thin activation layer is for example a $Cs_2O$ or Ag—$Cs_2O$ layer, deposited by evaporation under vacuum. As indicated above, this layer enables the vacuum level to be lowered and the photoelectric emission to be thus facilitated.

Other compositions of active layer and emission layer could in particular be contemplated by those skilled in the art without departing from the scope of the present invention.

According to the second embodiment of the invention, the surface of the photocathode opposite to the input window is structured such that the first elementary layer of the active layer has its own photoelectric emission surface. For example, after depositing a mask, the emission layer and the second elementary layer are etched up to the first elementary layer. Thus, a first photoelectric emission surface associated with the first elementary layer $430_1$ and a second photoelectric emission surface associated with the emission layer 440 are obtained. The first photoelectric emission surface consists of zones $440_1$ of the first elementary layer $430_1$ and the second photoelectric emission surface consists of zones $440_2$ of the emission layer, 440.

If need be, the thin activation layer is deposited after the etching step such that it covers not only the zones $440_2$ of the emission layer 440 but also the zones $440_1$ of the first elementary layer $430_1$.

Whatever the contemplated alternative, the first elementary layer is connected to a first electrode $470_1$ and the zones $440_2$ of the emission layer 440 are connected to elementary electrodes $470_2$, forming a metal gate. Thus, the first elementary layer can be brought to a potential $V_1$ and the emission layer can be brought to a potential $V_2$. The anode voltage $V_a$ of the detector is chosen such that $V_a > V_1$, $V_2$.

When $V_2 > V_1$ is imposed, with $V_2$ slightly higher than $V_1$, the zones $440_2$ of the emission layer essentially emit photoelectrons generated in the second elementary layer. The zones $440_1$ of the first elementary layer emit in turn photoelectrons generated in the first elementary layer. Thus, an image both in the visible spectrum (contribution of the zones $440_1$) and in the SWIR spectrum (contribution of the zones $440_2$), $I_{V\&SWIR}$ can be obtained. When the photocathode is mounted in an EBCMOS or EBCDD type detector, the pixels corresponding to the zones $440_1$ can be discriminated from those corresponding to the zones $440_2$ and thus two distinct images can be respectively obtained.

On the other hand, when $V_2 < V_1$ is chosen, the zones $440_2$ of the emission layer do not emit photoelectrons in so far as the latter do not have sufficient energy to pass above the interface barrier. The zones $440_1$ in turn continue to emit the photoelectrons generated in the first elementary layer. Thus, an image is obtained only in the visible spectrum, $I_V$.

Therefore, it is understood that depending on the potentials $V_1$,$V_2$, an image in the visible or an image in the SWIR spectrum, or even a combination of both images can be obtained.

To align images in visible and in SWIR spectrum and improve their resolution, an interpolation can be made between the pixels corresponding to the patterns $440_1$ and/or between the pixels corresponding to the patterns $440_2$.

As in the first embodiment, the patterns $440_1$ and $440_2$ can be arranged according to periodical arrays or, in case of Moiré effect, according to pseudo-periodical arrays.

Figure 5:
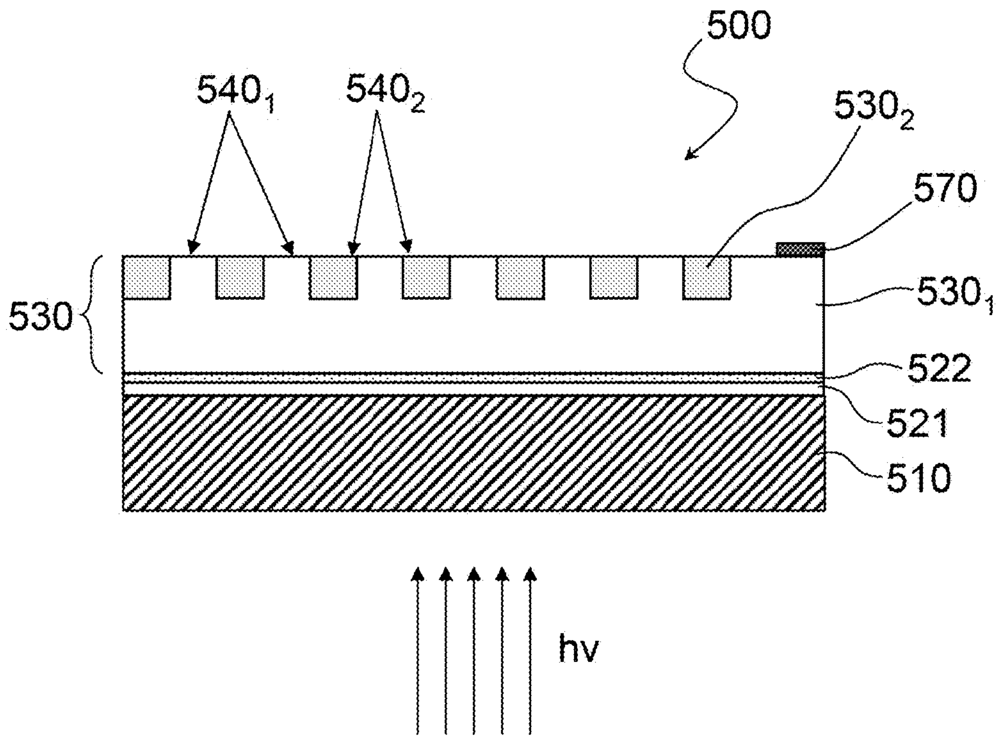
FIG. 5 represents the structure of a multilayer photocathode according to an alternative of the first embodiment of the invention.

FIG. 5 represents the structure of a multilayer photocathode according to an alternative of the first embodiment of the invention.

Elements 510 to $540_1$-$540_2$, correspond to elements 210 to $240_1$-$240_2$ of FIG. 2.

However, according to this alternative, the first elementary layer $530_1$ of the active layer is first etched after masking the first patterns. The second elementary layer $530_2$ is then epitaxially grown in the wells obtained by etching to obtain the second patterns. After epitaxy of the second layer, a mechanical polishing is conducted until the first elementary layer is flush. Thus, a planar emission surface is obtained, wherein the first and second patterns alternate.

Figure 6:
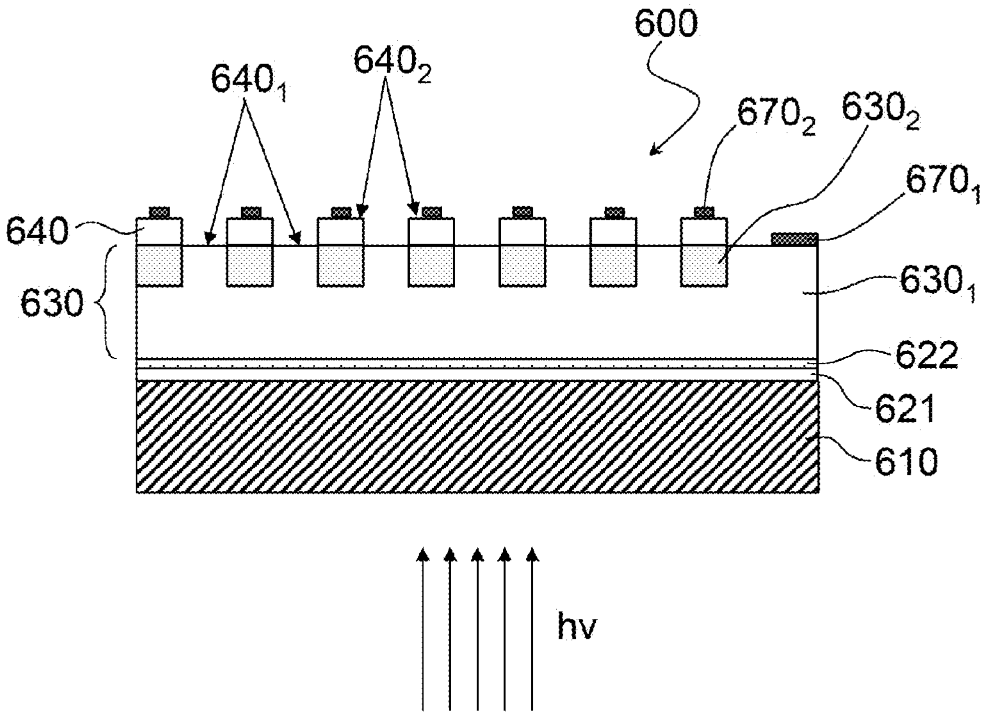
FIG. 6 represents the structure of a multilayer photocathode according to an alternative of the second embodiment of the invention.

FIG. 6 represents the structure of a multilayer photocathode according to an alternative of the second embodiment of the invention.

Elements 610 to $670_1$-$670_2$, correspond to elements 410 to $470_1$-$470_2$ of FIG. 4.

This alternative differs from that of FIG. 4 in that the first elementary layer $630_1$ is etched after masking the first patterns. The second elementary layer $630_2$ is then epitaxially grown in the wells obtained by etching to obtain the second patterns. After growing the second elementary layer, the photoelectron emission layer, 640 is grown before removing the mask. The activation layer is then deposited onto the entire surface before depositing the electrodes $670_1$-$670_2$.

What is claimed is:

1. A photocathode comprising an input window (210, 410, 510, 610) for receiving a flow of incident photons and an active layer, the active layer comprising a plurality of elementary layers ($230_1$, . . . , $230_N$; $430_1$, . . . , $430_N$; $530_1$, . . . , $530_N$; $630_1$, . . . , $630_N$) made of semiconductor materials having decreasing band gaps in the direction of the flow of incident photons, said photocathode being characterized in that the surface of the photocathode opposite to the input face is structured such that each elementary layer of the active layer has its own photoelectric emission surface ($240_1$, . . . , $240_N$; $440_1$, . . . , $440_N$; $540_1$, . . . , $540_N$; $640_1$, . . . , $640_N$).

2. The photocathode according to claim 1, characterized in that the photoelectric emission surface of each elementary layer is formed by an array of patterns, the patterns of two successive elementary layers being interleaved.

3. The photocathode according to claim 1, characterized in that the active layer consists of a first elementary layer made of GaAs or GaAsP and a second elementary layer of a semiconductor material chosen from $Ga_{1-x}In_xAs$, $GaAs_{1-x}Sb_x$, $GaAs_{1-x}Bi_x$ with $1>x>0$.

4. The photocathode according to claim 1, characterized in that the different photoelectric emission surfaces of the elementary layers are covered with an activation layer.

5. The photocathode according to claim 1, characterized in that the active layer (430, 630) consists of a first elementary layer ($430_1$, $630_1$) and a second elementary layer ($430_2$, $630_2$), the second elementary layer being covered by an emission layer (440, 640) for emitting in vacuum the photoelectrons generated in the second elementary layer, the first elementary layer ($430_1$, $630_1$) having a first photoelectric emission surface ($440_1$, $640_1$) and the emission layer having a second photoelectric emission surface ($440_2$, $640_2$).

6. The photocathode according to claim 5, characterized in that the first elementary layer ($430_1$, $630_1$) is connected to a first electrode ($470_1$, $670_1$) and in that the emission layer is connected to a second electrode ($470_2$, $670_2$) distinct from the first electrode so as to be able to bring the first and second electrodes to different potentials.

7. The photocathode according to claim 6, characterized in that the photoelectric emission surface of the first elementary layer is formed by a first array of patterns, and in that the photoelectric emission surface of the emission layer is formed by a second array of patterns, the patterns of the first and second arrays being interleaved.

8. The photocathode according to claim 7, characterized in that the first and second arrays of patterns are periodical.

9. The photocathode according to claim 7, characterized in that the first and second arrays are pseudo-periodical.

10. The photocathode according to claim 5, characterized in that the first and second photoelectric emission surfaces are covered with an activation layer.

11. The photocathode according to claim 5, characterized in that the first elementary layer is made of InP, in that the second elementary layer is made of GaInAs, GaInAsP, AlInAsP and in that the emission layer is made of InP.

12. The photocathode according to claim 5, characterized in that the first elementary layer is made of GaAs, in that the second elementary layer is made of GaInAs and in that the emission layer is made of GaInP.

13. The photocathode according to claim 5, characterized in that the activation layer is made of $Ag—Cs_2O$.

14. The photocathode according to claim 1, characterized in that the active layer is deposited on an electronic mirror consisting of a layer of a semiconductor material the band gap of which is higher than the band gaps of the elementary layers.

* * * * *